(12) United States Patent
Pastoor et al.

(10) Patent No.: US 8,522,722 B2
(45) Date of Patent: Sep. 3, 2013

(54) DEVICE FOR FEEDING ANIMALS

(75) Inventors: Jan Lambertus Pastoor, Delft (NL); Karel Van Den Berg, Bleskensgraaf (NL)

(73) Assignee: Lely Patent N.V., Maassluis (NL)

(*) Notice: Subject to any disclaimer, the term of this patent is extended or adjusted under 35 U.S.C. 154(b) by 83 days.

(21) Appl. No.: 12/905,119

(22) Filed: Oct. 15, 2010

(65) Prior Publication Data

US 2011/0023787 A1 Feb. 3, 2011

Related U.S. Application Data

(63) Continuation of application No. PCT/NL2009/000086, filed on Apr. 9, 2009.

(30) Foreign Application Priority Data

Apr. 16, 2008 (NL) .................................. 1035302

(51) Int. Cl.
*A01K 5/00* (2006.01)

(52) U.S. Cl.
USPC ....... 119/521; 119/57.1; 119/51.01; 119/61.1

(58) Field of Classification Search
USPC ................. 119/408, 51.01, 51.12, 52.3, 57.1, 119/57.9, 57.92, 58, 59, 62, 63, 52.1, 521, 119/61.1
See application file for complete search history.

(56) References Cited

U.S. PATENT DOCUMENTS

| | | | |
|---|---|---|---|
| 1,797,159 A * | 3/1931 | Shafer | 119/523 |
| 2,751,883 A | 6/1956 | Bacon | |
| 3,112,731 A * | 12/1963 | Lako et al. | 119/51.12 |
| 3,734,059 A | 5/1973 | Rodrigues | |
| 3,747,897 A * | 7/1973 | Conley | 256/10 |
| 3,900,009 A * | 8/1975 | Rodrigues | 119/752 |
| 4,171,684 A | 10/1979 | Herr et al. | |
| 5,423,289 A * | 6/1995 | Larsen et al. | 119/520 |
| 5,572,954 A | 11/1996 | Elkins | |
| 5,967,091 A * | 10/1999 | Zartman | 119/522 |

FOREIGN PATENT DOCUMENTS

| | | |
|---|---|---|
| DE | 1137893 A | 10/1962 |
| DE | 2745522 A1 | 4/1979 |
| DE | 3218380 A1 * | 11/1983 |
| EP | 635203 A2 | 1/1995 |
| EP | 1579760 A2 | 9/2005 |
| EP | 1707049 A1 | 10/2006 |
| GB | 1587283 A | 4/1981 |
| WO | 9713049 A1 | 4/1997 |

OTHER PUBLICATIONS

International Search Report and Written Opinion of PCT/NL2009/000086.

* cited by examiner

*Primary Examiner* — Rob Swiatek
*Assistant Examiner* — Lisa Tsang
(74) *Attorney, Agent, or Firm* — Hoyng Monegier LLP; Coraline J. Haitjema; David P. Owen

(57) ABSTRACT

A device for feeding animals, includes a frame with a feed holder for a feeding site for an animal. The frame is provided with a restricting device for restricting in at least two opposite lateral directions a dwelling space for an animal using the feeding site. The device is also provided with a distancing mechanism for keeping animals located outside the dwelling space at a distance from the restricting device.

26 Claims, 5 Drawing Sheets

DEVICE FOR FEEDING ANIMALS

CROSS REFERENCE TO RELATED APPLICATIONS

This application is a continuation of PCT application number PCT/NL2009/000086 filed on 09 Apr. 2009 which claims priority from Netherlands application number 1035302 filed on 16 Apr. 2008, the contents of both applications are hereby incorporated by reference in their entirety.

BACKGROUND OF THE INVENTION

1. Field of the Invention

The invention relates to a feeding device for the supplementary feeding of livestock, such as cattle, in particular with concentrate. A feeding device of this type can be embodied as a stationary arrangement, in a shed, or as a movable arrangement, to be placed and displaced outdoors.

2. Description of the Related Art

European patent application 1,683,411 discloses a displaceable animal feeding device to be placed outdoors, comprising a frame with a storage chamber for the feed, a feeding site with a trough for the feed for one animal, and a metering device, which is activated by a control unit, between the storage chamber and the trough. A motor, which is powered with the aid of PV panels which are placed on the frame, is provided for driving the metering device.

The feeding site is delimited to both sides by end partitions of the animal feeding device, which partitions are formed by pipes of the frame and a cloth tensioned therebetween.

A known stationary animal feeding device is also provided with two pieces of cloth which laterally screen the dwelling site.

It is important that an animal which uses a feeding site ingests the entire metered amount of concentrate presented for that animal. It can however occur that an animal which uses the feeding site is ousted therefrom by other animals from its herd. The ousting animal will then eat the concentrate which was intended for the former animal. This is disadvantageous for the former animal. Furthermore, this impedes accurate monitoring of the animals of the herd.

BRIEF SUMMARY OF THE INVENTION

An object of the invention is to provide an animal feeding device for supplementary feed or concentrate with which the feeding behavior of an animal is promoted.

An object of the invention is to provide an animal feeding device for supplementary feed or concentrate with which a feeding animal is troubled less by interventions by other animals from its herd.

An object of the invention is to provide an animal feeding device for supplementary feed or concentrate with which, with limited added mass, a feeding animal can be screened from other animals.

According to various aspects of the present invention, the invention provides a device for feeding animals, comprising a frame with a feed holder for a feeding site for an animal, wherein the frame is provided with a restricting device with restricting means for restricting in at least two opposite lateral directions a dwelling space for an animal using the feeding site, also provided with means for keeping animals located outside the dwelling space at a distance from the restricting means.

This prevents the other animals from forcing themselves upon the animal which is in the dwelling space, which as a result is left in greater peace to consume its feed.

In one embodiment, the distancing means (distancing mechanism) are carried by the restricting means (restricting device). The distancing means are then added to the restricting means and can be designed for the sole purpose of distance-keeping.

In a first further development, the distancing means form a physical barrier, preferably at a horizontal distance from the restricting means. The distancing means can for example function in a manner comparable to that of a head or shoulder beam. The horizontal distance can be dependent on the dimensions and species of the animals for which the device is intended. The distance is such that the animals in the environment are kept with their snout outside the dwelling site. Thus, the distancing means can be positioned at a height of the breast or of the throat of the animal in question, wherein the horizontal distance is then greater than the maximum snout-throat/breast distance.

In one embodiment, the restricting means and/or the distancing means comprise one or more rods. In a simple embodiment thereof, rods of the restricting means and the distancing means merge with one another. The rods of the restricting means and the distancing means can in this case define, viewed from above, at each side a U shape, with the bottom of the U at the end remote from the feeding site. As a result, the other animals are kept in a simple manner at a distance from the hindquarters of the feeding animal. A brace shape of this type can also be advantageous for the running into and out of the dwelling site by the animal.

The rods of the restricting means and the distancing means can define, viewed from above, with both sides a U shape. In one embodiment thereof, the "bottom" of the U is situated at the side of the feeding site.

The distancing means can be adjustable in the vertical and/or horizontal position, for adaptation to the dimensions of the animals for which the device is intended.

In another embodiment, the distancing means comprise startling means. In this case, the other animals are forced to keep their distance by invoking a response from those animals. In one embodiment, the startling means are, in a manner known per se, electrically active for generating a shock on contact, such as for example an electric fence. A provision of this type adds little mass.

In one embodiment, the startling means (startling mechanism) are only active in a direction leading away from the restricting means. If it is desirable to prevent the feeding animal from pressing excessively against the restricting means, which might cause damage to the restricting means, it is also possible to provide startling means which are active at the side of the restricting means that faces the dwelling site.

In order not to disturb the entrance of an animal which may use the feeding site, the device can be provided with means for activating the startling means on occupation of the dwelling site by an animal for use of the feeding site. The distancing means are then only active during the use of a feeding site.

In one embodiment, the startling means are situated at a horizontal distance from the restricting means. The distance to the restricting means and the height thereof with respect to the ground level may be comparable to those proposed hereinbefore for the physical distancing means.

Alternatively, the startling means can be mounted on the restricting means. They can for example be mounted on the outside of rods, or be incorporated in a screen, preferably a sheet or cloth-like screen. The screen can in this case comprise a cloth (which adds little mass) containing therein electrical conductors which are exposed at the side remote from the dwelling space.

The screen can be suspended from a bracket, for example in the manner of a curtain. If the bracket extends well above the dwelling site, the bracket remains for the most part protected from impact forces exerted by the animals. These forces are accommodated by the cloth. The bracket can as a result be light in its construction.

By having the screen extend, viewed from above, in a U shape, the bottom of the U being located at the end remote from the feeding site, the feeding animal is completely shielded.

In another embodiment, the distancing means form a screen which is non-transparent, at least in a direction toward the dwelling space, preferably a cloth. The distancing means are then visually effective, and more passive. The other animals are not enticed to approach the device, because they do not see any other animal there, in particular if the screen extends from a level above the feeding site to at least substantially the ground surface. The restricting means can here also form the distancing means.

In this case too, the screen can be suspended from a bracket which preferably extends well above the dwelling site.

If the screen also extends in a direction leading away from the dwelling site over a ground surface area, the other animals are also physically kept at a distance from the screen. They will tend not to tread on the edge portion, which is lying on the ground, of the screen and, if that portion is of a suitable size, as a result cannot touch the upright portion of the screen with their snout so that the feeding animal is left in peace.

In the aforementioned applications of a screen, the screen can be displaceable between an extended use position and a retracted storage position. That is in particular possible if the screen forms a sort of curtain. In the withdrawn storage position, the animal which may feed can easily reach the feeding site.

In all the aforementioned embodiments, provision may be made for the restricting device to be movably connected to the frame for displacement between a use position and a storage position in which the feeding site is freely accessible.

From a further aspect, the invention provides a device for feeding animals, comprising a frame with a feed holder for a feeding site for an animal, means for the screening of a dwelling site for an animal making use of the feeding site, wherein the frame is provided with a bracket extending well above the dwelling site, the screening means comprising a screen which is suspended from the bracket. The bracket is for the most part protected from forces exerted by the animals, in particular if the screen is sheet or cloth-like and is thus easily deformed and yields.

The screen can be embodied in accordance with one of the embodiments of the screen discussed hereinbefore. If the screen does not have to be completely non-transparent, it can also be constructed from vertically extending tapes, such as are known per se from door screens in houses. Tapes of this type can be provided with startling means.

The screen can itself, for example as a curtain, be retracted and extended. Alternatively, the bracket can be positioned to bring the screen into and out of an operating position. For this purpose, the bracket can for example be retractable/extendable in the horizontal direction, or be able to swivel upward and downward.

In one embodiment, the frame of the device according to the invention is provided with a storage holder for feed and with means for supplying feed to the feed holder.

BRIEF DESCRIPTION OF THE DRAWINGS

The features and advantages of the invention will be appreciated upon reference to the following drawings, in which.

The invention will be commented on with reference to a number of exemplary embodiments represented in the appended drawings, in which.

DESCRIPTION OF ILLUSTRATIVE EMBODIMENTS

Figure 1A:
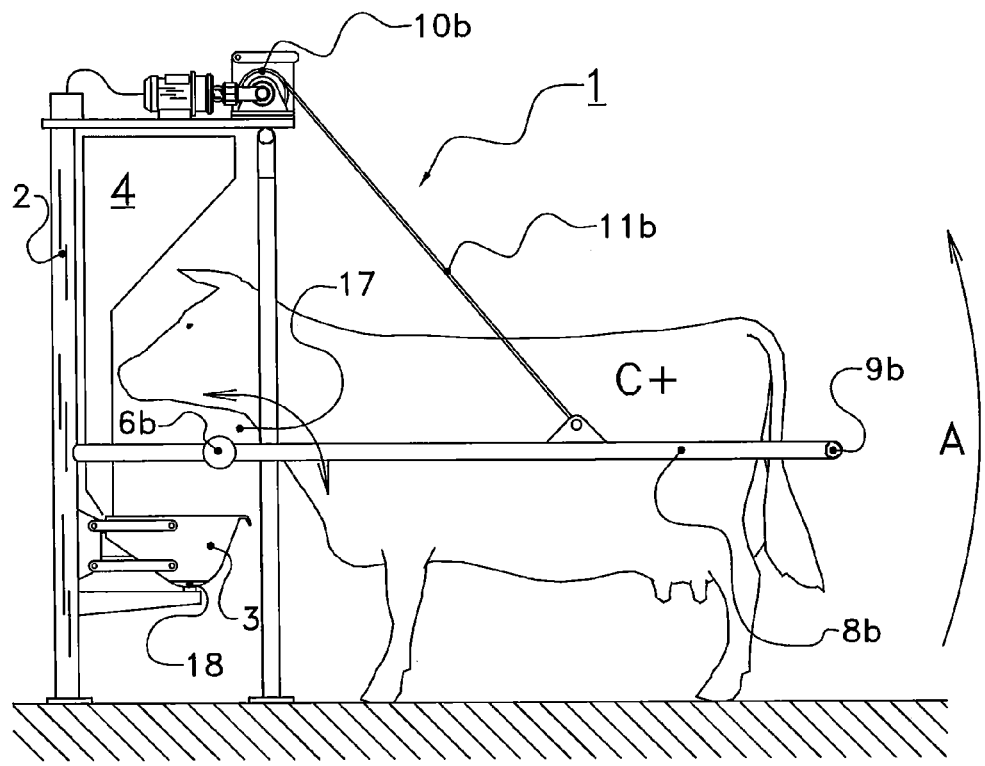
FIGS. 1A and 1B are a schematic side view and plan view respectively of a first exemplary embodiment of an animal feeding device according to the invention.

The following is a description of certain embodiments of the invention, given by way of example only and with reference to the drawings. The animal feeding device 1 of FIGS. 1A and 1B comprises a frame 2 which is fixedly arranged or can be displaceable. The frame 2 can for example be embodied as described in European patent application 1,683,411, which is hereby incorporated by reference in its entirety.

Mounted in the frame 2 is a feed trough 3 which defines a feeding site and wherein feed originating from a storage holder 4 for concentrate or supplementary feed can be presented to an animal, here cow C+, which is located at a dwelling site 5. On the basis of the identification of the cow, in the conventional manner by the reading, with the aid of a sensor 17, of the transponder on the cow, the feed dose intended for that cow is automatically dispensed to the feed trough 3.

The dwelling site 5 is delimited to the front by the frame 2 and delimited to both sides by bar portions 7a, 7b. The bar portions 7a, 7b merge at the trailing end of the dwelling site 5 with bar portions 8a, 8b via end bar portions 9a, 9b. The braces 12a, 12b thus formed are connected to the frame 2 at the site of hinges 6a, 6b so as to be able to hinge about a horizontal axis (A). For the upward swivelling of the bars in direction A, they are connected via a cable 11a, 11b to coils 10a, 10b which are driven by a motor (not shown).

In FIG. 1A, the height H of the braces 12a, 12b is roughly the throat height of the cows C, for example 0.8 m. The width of the dwelling site 5 is somewhat greater than the width of the cows C, for example 0.9 m. The protruding length of the braces is about the same of that of the cows C, for example 2.5 m. The width of the braces 12a, 12b is in this case at least about 1.5 times the length of the head of the cows C, for example the length of the head+ neck. Although not shown here, the site of the hinges 6a, 6b can be adapted to the dimensions of the livestock, in the vertical direction and/or in the horizontal direction.

Figure 1B:
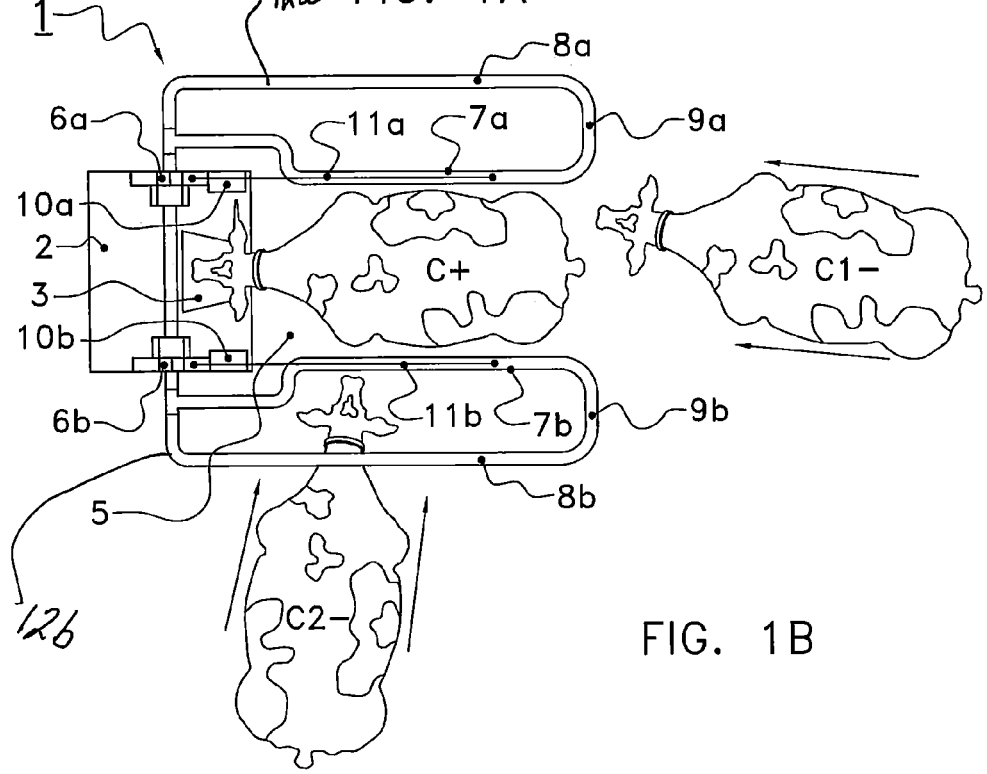

As may be seen in FIG. 1B, the cow C+ fits on the dwelling site 5 between the bar portions 7a, 7b. As a result, at the trailing end, there is hardly space for the head of another cow C1− which is not desired at that moment on the dwelling site and cannot oust the cow C+. Also from the side, the cow C+ is protected from contact by the cows C−. In an attempt to disturb the cow C+, the cows C− must lower their head, as a result of which bar portion 7b forms a barrier for the upper side of the neck of the cows C−. Then, they cannot quite reach the cow C+ with their snout.

When the cow C+ has consumed its share of feed this can be noted by a weight sensor 18. A control unit (not shown) with a programmable computer activates on the basis of that data the driving of the coils 10a, 10b in order to haul in the cables 11a, 11b and thus to tilt the braces 12a, 12b upward (B), as a result of which the cow C+ can easily run away. Afterwards, the braces 12a, 12b are lowered again into the position shown in FIGS. 1A and 1B.

Figure 2A:
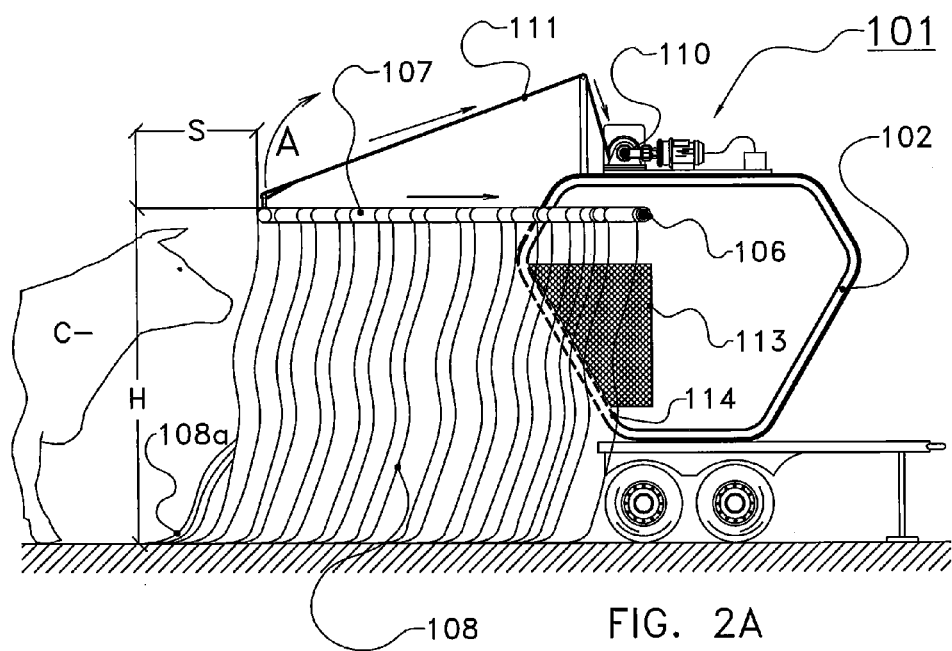
FIGS. 2A and 2B are a schematic side view and plan view respectively of a second exemplary embodiment of an animal feeding device according to the invention.
Figure 2B:
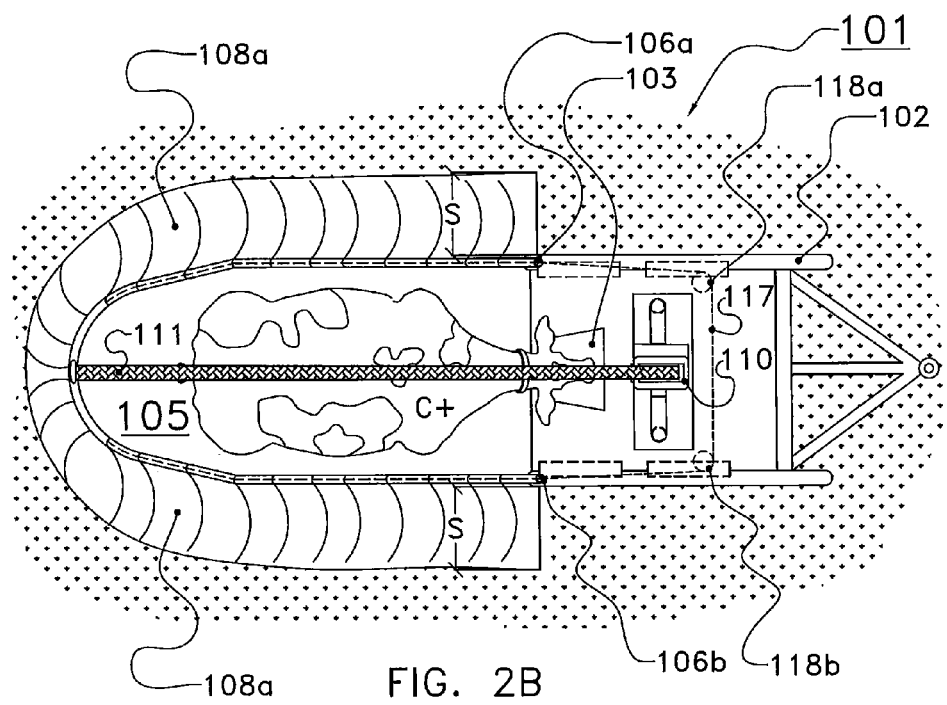

The animal feeding device 101 of FIGS. 2A and 2B comprises a mobile frame 102. A feed trough 103 is incorporated in the frame 102. The above-discussed storage holder with controlled dispensing, sensors and control unit are also present here.

A brace 107 made of light, flexible plastics material, such as fibre glass, is fastened to the frame 102 so as to be hingeable at the site of hinges 106a, 106b. The brace 107 is connected to a driven coil 110 by means of a cable 111. The site of the hinges 106a, 106b is adjustable in the horizontal direction to adapt the length of the dwelling site 105, which is spanned by the brace 107, to the livestock.

The brace 107 carries a curtain 108 made of flexible plastics material sheet or cloth, which is non-transparent. The height H of the brace 107 is greater than the height of the largest cow, with its head raised, which could make use of the animal feeding device in question, so that the animals cannot directly contact the brace 107, as a result of which the forces exerted on the brace remain limited.

The cloth 108 has a vertical length which is greater than H, for example 2m, as a result of which an edge region 108a of the cloth 108 comes to lie at ground level, and lies with the edge in the horizontal direction at a distance S from the upright part of the cloth 108.

In FIGS. 2A and 2B, a cow C+ is located on the dwelling site 105. The cow C+ is guided on its journey to the feed trough 103 by short guide partitions 114a, 114b. For the welfare of the cow C+, gauze windows 113a, 113b are provided to the side of it. The non-transparent cloth 108 ensures that the cows C1−, C2− do not notice the cow C+. Generally, they will not necessarily have any tendency to press against the cloth 108 with their snouts. Should that nevertheless happen, the edge region 108a, which is positioned at ground level, ensures that the cows C1−, C2− remain at a minimum distance S and cannot touch the cloth 108 with their snouts and cannot disturb the cow C+.

The cow C+ can therefore consume its full feed dose undisturbed. When this has been signalled to the control unit, it activates the driving for coil 110 and the brace 107 is swivelled upward (A). The cow C+ can then easily leave the dwelling site 105. When a following cow has arrived before the feed trough and is positively identified for obtaining a feed dose, the control unit causes the coil drive 110 to lower the brace 107 again, wherein the cow which is then present is surrounded by the cloth 108. Once the feed dose has been dispensed, this cow can also consume its feed undisturbed.

Instead of releasing and closing the dwelling site 105 by swivelling the brace 107, the brace 107 can remain horizontal and the cloth 108 be extended and hauled in by means of a wire 117, which is connected thereto and guided along the brace 107, from one side, with the aid of rollers 118a, 118b engaging the wire 117, one of which can be driven in both directions.

Figure 3A:
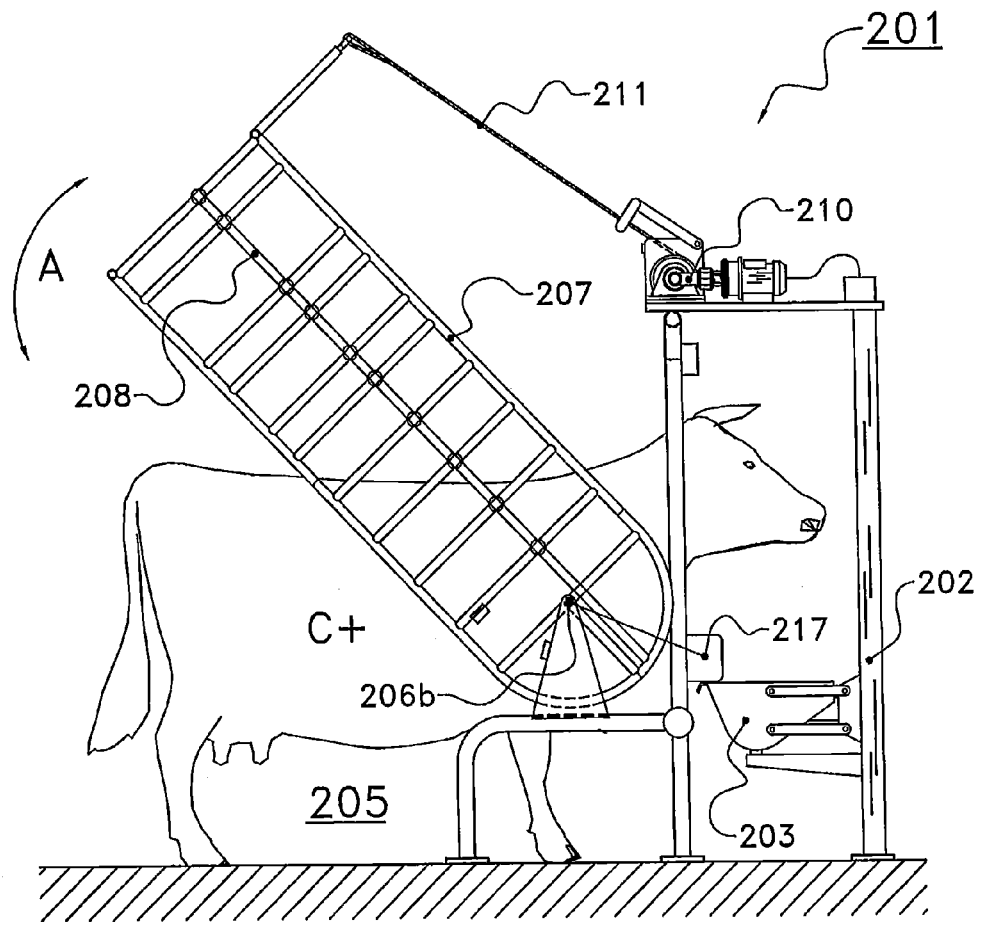
FIGS. 3A and 3B are a schematic side view and plan view respectively of a third exemplary embodiment of an animal feeding device according to the invention.
Figure 3B:
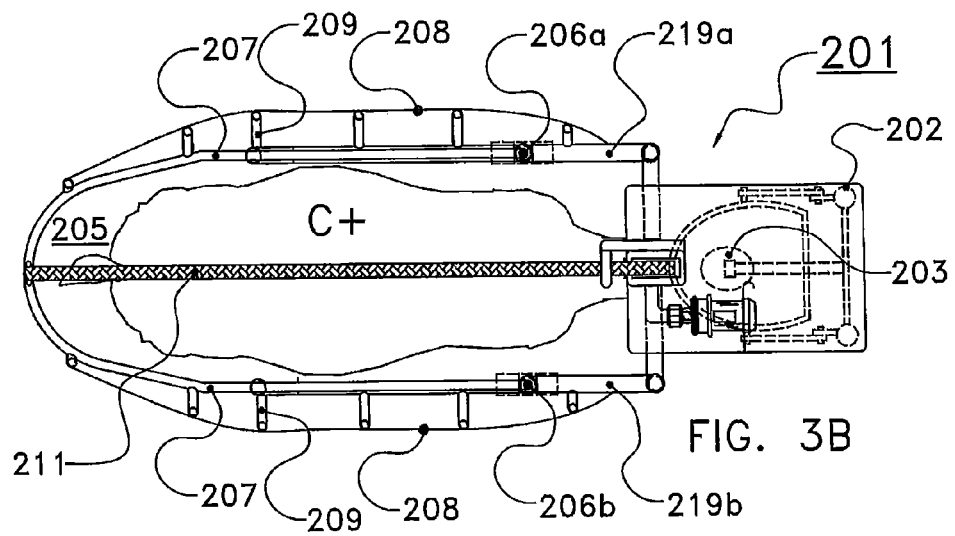

The animal feeding device 201 of FIGS. 3A and 3B comprises a frame 202. A feed trough 203 is incorporated in the frame 202. The above-discussed feed storage holder with controlled dispensing, sensors and control unit are also present here.

A U-shaped gate 207 is fastened to the frame 202 so as to be hingeable on both sides at the site of hinges 206a, 206b in order to be swivelled, by activating the drive of a coil 210 and a belt 211 which can in this way be hauled in or passed out, upward or downward (A), between the entry and exit position shown in FIG. 3A and the use position (shown with hatching in FIG. 3A and in a plan view in FIG. 3B) screening the dwelling site 205.

On the outside, the gate 207 is provided with a number of brackets 209 which hold an electric fence 208 at the ends. A power supply 217 for the electric fence 208 is provided in the frame 202. The height H of the electric fence 208 is adapted to the height of the snouts of the animals in question, and can if appropriate be adjusted thereto, in a manner not represented in greater detail. The length S of the brackets 209 is at least the length of the head of the animals in question.

During feeding, the cow C+ will be shielded by the gate 207, to the sides and to the rear edge. Although other cows do see the cow C+ there, they are kept at a distance from the gate 207 by the electric fence 208.

The cow C+ can therefore consume its entire feed dose undisturbed. When the control unit has received the relevant signal, it uncouples the power supply 217 from the electric fence 208 and it activates the drive for coil 210 and the gate 207 is swivelled upward (A). The cow C+ can then easily leave the dwelling site 205. When a following cow has arrived before the feed trough and is positively identified for obtaining a feed dose, the control unit causes the coil drive 210 to lower the gate 207 again, wherein the cow which is then present is surrounded by the gate 207. The power supply 217, which until then remained uncoupled, is recoupled to the electric fence 208. Once the feed dose has been dispensed, this cow can also consume its feed undisturbed.

Figure 4A:
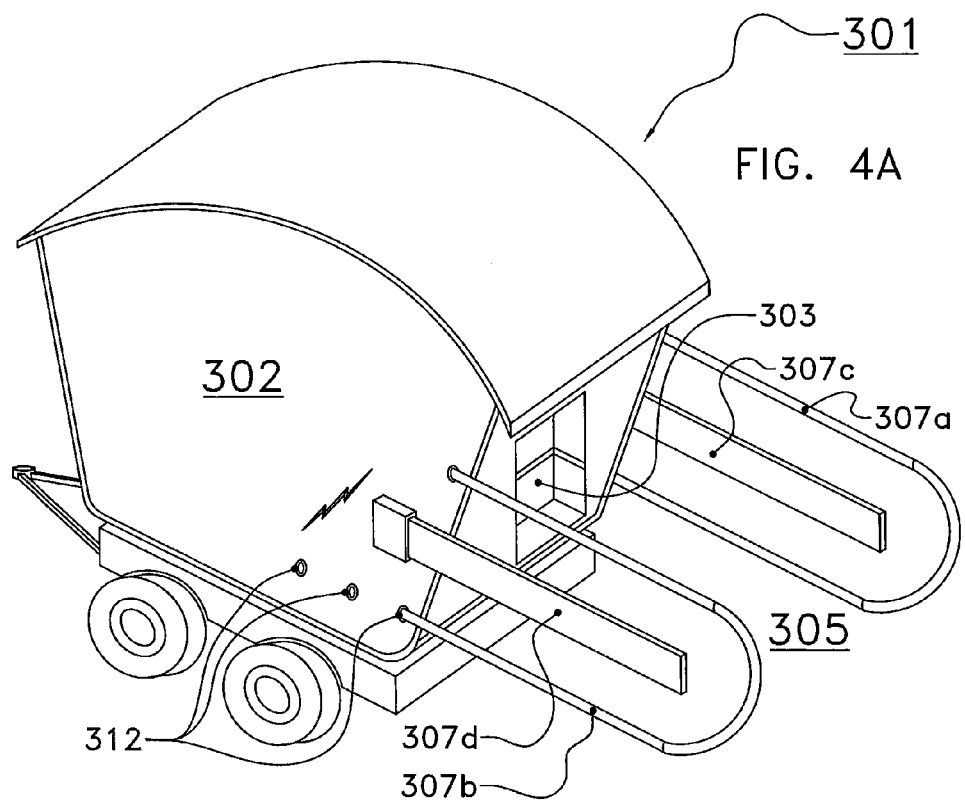
FIGS. 4A and 4B are a schematic isometric and end view respectively of a fourth exemplary embodiment of an animal feeding device according to the invention.
Figure 4B:
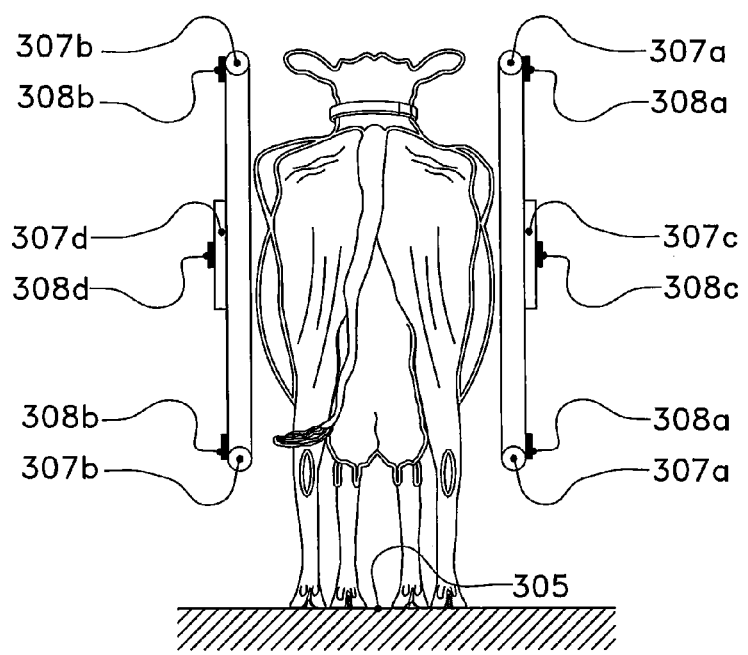

The animal feeding device 301 of FIGS. 4A and 4B comprises a mobile frame 302. A feed trough 303 is incorporated in the frame 302. The above-discussed storage holder with controlled dispensing, sensors and control unit are also present here.

A dwelling site 305 is laterally screened by means of flexible plastics material (for example fibre glass) bars 307a, 307b, of which the bottom end is fastened, at the site of holes 112 to be selected, to the frame 302 in order to adapt the range to the animals in question, and the top end is securely fastened to the frame 302. The width of the dwelling site 305 can be somewhat greater than the width of the animal to be served, for example 0.9 m. The protruding length of the bars 307a, 307b can be for example 2.5 m.

Rigid brackets 307c, 307d, which are securely fastened to the frame 302, reach into the loop which the bars 307a, 307b define. Both the bars 307a, 307b and the brackets 307c, 307d can be provided on the outside with a conductor for startling voltage. This is represented schematically in FIG. 4B, with conductors 308a-d. When an authorized animal is located on the dwelling site 305, the control unit couples the power supply to the conductors 308a-d in order to keep the other animals at a distance. When the animal has consumed the feed intended for it, the voltage is removed from the conductors until a following authorized animal starts to consume its feed dose.

Optionally, the conductors 308a, 308b can be mounted in such a way that they are, at the ends of the braces 307a, 307b, directed away from the frame 302, i.e. toward the rear. They can then startle away non-authorized animals when they attempt to place their snout between the body of a feeding animal and the inner edge of the braces 307a, 307b.

Figure 5:
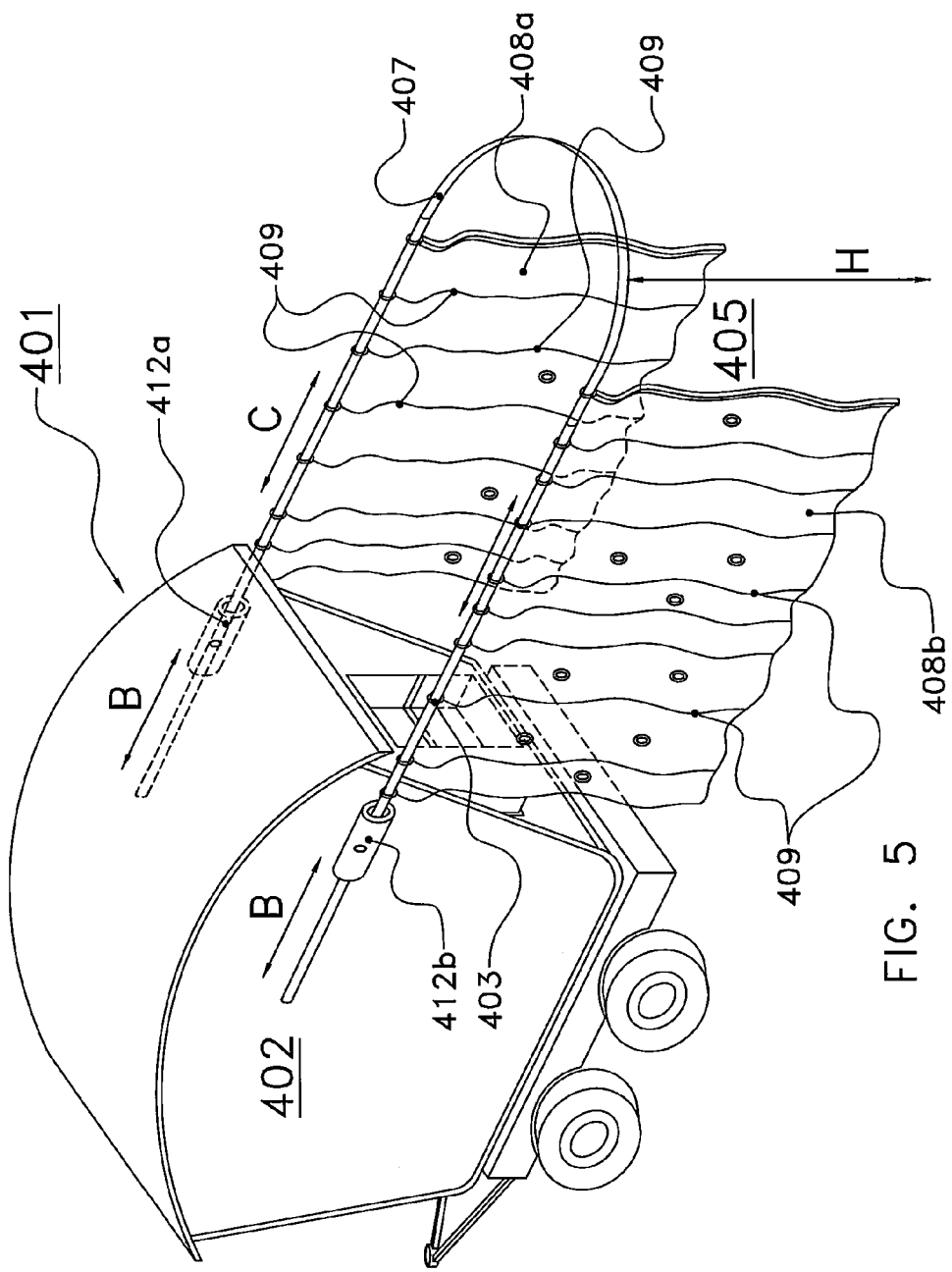
FIG. 5 is a schematic isometric view of a fifth exemplary embodiment of an animal feeding device according to the invention.

The animal feeding device 401 of FIG. 5 comprises a frame 402. A feed trough 403 is incorporated in the frame 402. The above-discussed storage holder with controlled dispensing, sensors and control unit are also present here.

A brace 407 made of flexible plastics material (for example fibre glass), comparable to brace 107 of the embodiment of FIGS. 2A, 2B, reaches horizontally to a height (for example 2m) which the animals cannot reach. The legs 407a, 407b of the brace 407 are held by holders 412a, 412b which are mounted on the frame 402 and are provided with drives which engage with the legs 407a, 407b. This can be for example a tooth engagement or a worm engagement. The range of the brace 407 can be adjusted in this way (directions B), adapted to the animals.

Flexible, plastics material cloths 408a, 408b are suspended, in the manner of a curtain, from the brace legs 407a, 407b. Mounted on the outside of the cloths 408a, 408b are wire-like conductors to which voltage can be applied using a power supply which is incorporated in the frame 402, when an authorized animal occupies the dwelling site 405 and other animals must be kept at a distance. When that animal has consumed its share of feed, the cloth can be at least partly removed by operating the drives in the holders 412a, 412b, as a result of which the legs 407a, 407b are retracted (C). The cloths 408a, 408b can in this case be rolled up on the legs 407a, 407b, as in a curtain. When the brace 407 is extended again, the cloths 408a, 408b will spread out of their own accord when those cloths are fixed, close to their outermost end edge, to the brace 407 and are secured, at their innermost end edge, to the frame 402. A wire (not shown), which is guided along the brace 407, can be used to further extend the cloths 408a, 408b in order to screen the back too, and to open after use (to the position shown in FIG. 5).

Alternatively, both cloths 408a, 408b can be fully retracted and extended, in a manner comparable to that which has been described as an alternative for the cloth 108, as a curtain, but then each at its own side.

For the feeding of the above-discussed embodiments of the animal feeding device according to the invention, the frame thereof can be provided with PV panels.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for feeding animals, comprising a frame with a feed holder for a feeding site for an animal, wherein the frame is provided with a restricting device, above and forms a dwelling space for the animal using the feeding site, wherein the restricting device is U-shaped when viewed from above, wherein the restricting device blocks other animals from approaching from at least two opposite lateral directions, the restricting device is provided with a distancing mechanism for keeping animals located outside the dwelling space at a distance from the restricting device; wherein the restriction device is hingeably connected to the frame and is pivotably movable about a horizontal axis to adjust a vertical position between an entry and exit position and a use position.

2. The device according to claim 1, wherein the distancing mechanism is carried by the restricting device.

3. The device according to claim 1, wherein the distancing mechanism forms a physical barrier.

4. The device according to claim 3, wherein the distancing mechanism forms a physical barrier at a horizontal distance from the restricting device.

5. The device according to claim 1, wherein the restricting device and/or the distancing mechanism comprise one or more rods.

6. The device according to claim 5, wherein rods of the restricting device and/or the distancing mechanism merge with one another.

7. The device according to claim 1, the bottom of the U-shape being located at an end of the restricting device situated nearest a feed holder of the feeding site.

8. The device according to claim 1, wherein the distancing mechanism comprises a startling mechanism.

9. The device according to claim 8, wherein the startling mechanism is only active in a direction leading away from the restricting device.

10. The device according to claim 8, wherein the startling mechanism is electrically active for generating a shock on contact.

11. The device according to claim 9, wherein the startling mechanism is configured to be activated upon occupation of the dwelling space by an animal using the feeding site.

12. The device according to claim 11, wherein the startling mechanism is situated at a horizontal distance from the restricting device.

13. The device according to claim 10, wherein the startling mechanism comprises an electric fence.

14. The device according to claim 10, wherein the startling mechanism is incorporated in a screen.

15. The device according to claim 14, wherein the screen comprises a cloth containing therein electrical conductors which are exposed at a side remote from the dwelling space.

16. The device according to claim 14, wherein the screen is suspended from a bracket.

17. The device according to claim 16, wherein the bracket extends well above the dwelling site.

18. The device according to claim 17, wherein the screen extends in a U shape when viewed from above, the bottom of the U-shape being located at an end remote from the feeding site.

19. The device according to claim 1, wherein the distancing mechanism forms a screen which is non-transparent, at least in a direction toward the dwelling space.

20. The device according to claim 19, wherein the screen forms a sheet or cloth.

21. The device according to claim 19, wherein the screen extends from a level above the feeding site to at least substantially the ground surface.

22. The device according to claim 21, wherein the screen is suspended from a bracket.

23. The device according to claim 22, wherein the bracket extends well above the dwelling space.

24. The device according to claim 19, wherein the screen extends in a lateral direction away from the dwelling space.

25. The device according to claim 1, wherein the restricting device and the distancing mechanism are one unit.

26. The device according to claim 19, wherein the screen is displaceable between an extended use position and a retracted storage position.

* * * * *